(12) United States Patent
Muirhead et al.

(10) Patent No.: US 6,578,688 B2
(45) Date of Patent: Jun. 17, 2003

(54) SPLINE CUSHION CLUTCH DRIVER FOR AN ELECTROMAGNETIC CLUTCH

(75) Inventors: Hugh James Muirhead, Ithaca, NY (US); Frank Joseph Mastromatteo, Kettering, OH (US)

(73) Assignee: North Coast Clutch Company, Inc., Ithaca, NY (US)

( * ) Notice: Subject to any disclaimer, the term of this patent is extended or adjusted under 35 U.S.C. 154(b) by 0 days.

(21) Appl. No.: 10/000,934

(22) Filed: Nov. 2, 2001

(65) Prior Publication Data

US 2003/0085095 A1 May 8, 2003

(51) Int. Cl.$^7$ .............................................. F16D 27/112
(52) U.S. Cl. ................ 192/84.941; 192/55.3; 192/84.961; 192/209
(58) Field of Search .............. 192/84.941, 84.961, 192/55.3, 55.6, 209; 464/73, 76

(56) References Cited

U.S. PATENT DOCUMENTS

| | | | | |
|---|---|---|---|---|
| 3,314,512 A | * | 4/1967 | Kerestury | 192/84.941 |
| 3,446,322 A | * | 5/1969 | Wrensch | 192/84.961 X |
| 3,752,279 A | * | 8/1973 | Briar | 192/84.941 |
| RE30,609 E | * | 5/1981 | Miller | 192/84.96 |
| 4,346,616 A | * | 8/1982 | Geisslinger et al. | 192/84.961 |
| 5,036,964 A | * | 8/1991 | Booth et al. | 192/84.5 |
| 5,372,228 A | * | 12/1994 | VanLaningham et al. | 192/84.941 |
| 5,862,902 A | * | 1/1999 | Howrie | 192/84.961 |

* cited by examiner

Primary Examiner—Richard M. Lorence
(74) Attorney, Agent, or Firm—Brown & Michaels, PC

(57) ABSTRACT

An automotive air conditioning compressor clutch eliminates all rivets and utilizes only one return spring. A hub with multiple radial teeth closely fitting into armature openings supports the armature plate concentric and parallel to a pulley friction disk. The armature is free to slide relative to the hub as the return spring is compressed. The thrust areas between the hub teeth and armature are large, which reduces compressive stress. The lower stress reduces the wear rate for both the all-metal and rubber torque cushion versions of the clutch.

10 Claims, 3 Drawing Sheets

SPLINE CUSHION CLUTCH DRIVER FOR AN ELECTROMAGNETIC CLUTCH

BACKGROUND OF THE INVENTION

1. Field of the Invention

The invention pertains to the field of automotive air conditioning compressor electromagnetic clutches. More particularly, the invention pertains to such a clutch with a reduced part count and large areas of sliding contact, which reduce stress and increase durability.

2. Description of Related Art

Almost all automotive air conditioning clutches are powered by a belt-driven pulley, a pulley that freely rotates about the drive shaft of the compressor, until an annular iron armature is pulled by an electromagnetic coil, against a friction disk of the pulley with enough force to cause the two to stick frictionally together. The armature, in turn, is physically supported on a central hub of the compressor drive shaft by an armature support mechanism that holds the armature coaxially to and spaced away from the pulley friction disk, close enough to be pulled into and against it when the clutch is actuated. The armature support mechanism must be radially and circumferentially rigid enough to successfully transfer drive torque from the co-rotating pulley and armature to the shaft. It also must allow the armature to move freely toward the pulley, when the clutch is turned on, and pull it away from the pulley as the clutch turns off. Ideally, the armature should be supported on the shaft hub by a mechanism that not only transfers torque and provides axial flexibility, but which also provides a measure of torsional flexibility and resilience, enough to reduce the shaft torque peaks from the pumping action of the compressor pistons. This is called a torque cushion design.

The typical prior art armature support mechanism consists simply of a rigid drive plate welded to the compressor drive shaft hub, and three or more simple leaf springs riveted at one end to the drive plate, and at the other end to the armature. The leaf springs lie in a plane parallel to the drive plate, and are fairly rigid in that plane, capable of transferring torque between the armature and drive plate and ultimately to the compressor drive shaft. However, the springs can flex easily in the axial direction, in cantilever fashion, since they are thin in the axial direction. This is an advantage, because it permits a low magnetic force to successfully pull the armature to the pulley friction disk. Examples may be seen in several issued patents, for example, U.S. Pat. No. 5,046,594 to Kakinuma, where armature 26 is joined to a hub mounted drive plate 28 by three thin leaf springs 27.

This is a very common design. Three leaf springs with two rivets each make 9 parts. Including the shaft hub, drive plate, and armature makes a total of 12 parts for this type of clutch, excluding the pulley.

Other designs use an annular rubber ring to perform both the torque cushion function and the flexible spring function. These designs are very stiff in the axial direction, a disadvantage, because a very high magnetic force is needed to pull the armature to the pulley friction disk. The rubber torque cushion outer diameter typically is bonded to an outer ring wall, which in turn is fastened to the armature with three or more rivets. The inner diameter of the rubber torque cushion typically is bonded to an inner ring wall, which in turn is riveted or welded to the shaft-mounted hub. The hub, torque cushion inner and outer bonding rings with three rivets each, and armature totals 10 separate parts.

SUMMARY OF THE INVENTION

The invention provides an armature with a multiple array of elongated piercings. The shaft-mounted hub has a similar array of elongated lugs, which fit closely into the armature piercings. A single spring anchored to the hub body pushes the armature away from the pulley friction disk, when the clutch is turned off. This spring may have a very low axial force, an advantage cited above. All rivets, drive plate, weld, multiple flat leaf springs and ring walls have been eliminated, resulting in an assembly of only three parts: the shaft hub, armature and spring. The small number of parts is a great advantage, substantially reducing manufacturing costs and increasing the reliability of the mechanism.

In the preferred embodiment, an iron armature, coaxial and opposed to a pulley friction disk, has fifteen (15) elongated radial piercings. The radial length of the armature piercings, combined with the thickness of the armature itself, provides a large bearing area to support the closely fitting and opposed sides of the shaft hub lugs. When the clutch is turned on, the tangential forces originating from the pulley belt are carried by the total edge area of the fifteen (15) armature piercings to the opposed hub drive lug surfaces. This large total support area for the tangential driving forces results in a low compressive stress between the armature edges and the sides of the hub lugs. Any rubber torque cushion pads interposed between the opposed faces of the armature piercings and hub lugs is then subject to only low compressive stress, which increases the durable life of the rubber dramatically.

In an alternative embodiment, no rubber torque cushion is used, substantially reducing the cost of the assembly. In this embodiment, the large metal to metal contact area between the armature piercings and hub lugs has a very low wear rate, due to the low compressive stress over this area. This has the advantage of prolonging the useful life of the clutch.

In both the preferred embodiment and the alternate embodiment, multiple concentric areas support the concentricity of the armature to the hub. First, the outer diameter of the hub itself closely fits within the internal diameter of the armature. The thickness of the armature provides a cylindrical support area between the hub outer diameter and armature inner diameter. Second, the areas of the inboard ends of the hub lugs are radially opposed to the thickness of the armature at the inner end of the armature piercings. Third, the outboard ends of the hub lugs are radially opposed to the thickness of the armature at the outer ends of the armature piercings. The sum of the three concentric areas of radial support provides a very large total circumferential contact area between the armature and shaft hub. This large circumferential area supports any radial forces arising from operation of the clutch, and results in very low radial compressive stress. This reduces the wear rate between the opposed circumferential surfaces to a minimum, prolonging the useful life of the clutch.

In both the preferred and alternate embodiment, one end of a single compression spring in direct contact with the armature pushes it from the pulley friction disk, when the clutch is turned off. The other end of the compression spring is closely fitted into and anchored by a groove in the hub outer diameter. The compression spring optionally is made from coiled wire, a Belleville washer, or a solid elastomeric material, such as rubber, or any other similarly suitable material.

DETAILED DESCRIPTION OF THE INVENTION

Figure 1:
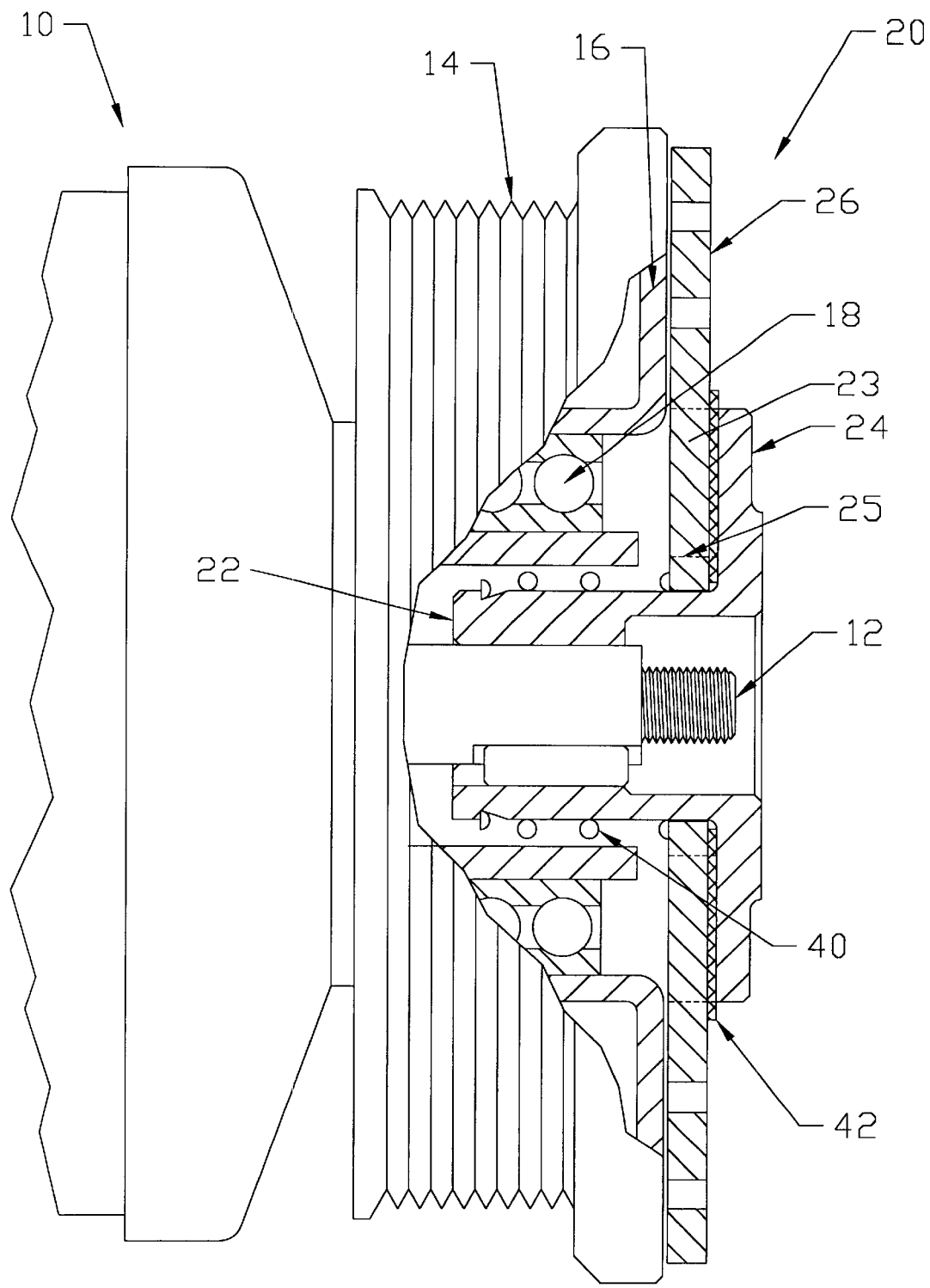
FIG. 1 shows a cross section of the clutch assembly of the present invention, showing the compressor housing and part of the pulley broken away.
Figure 2:
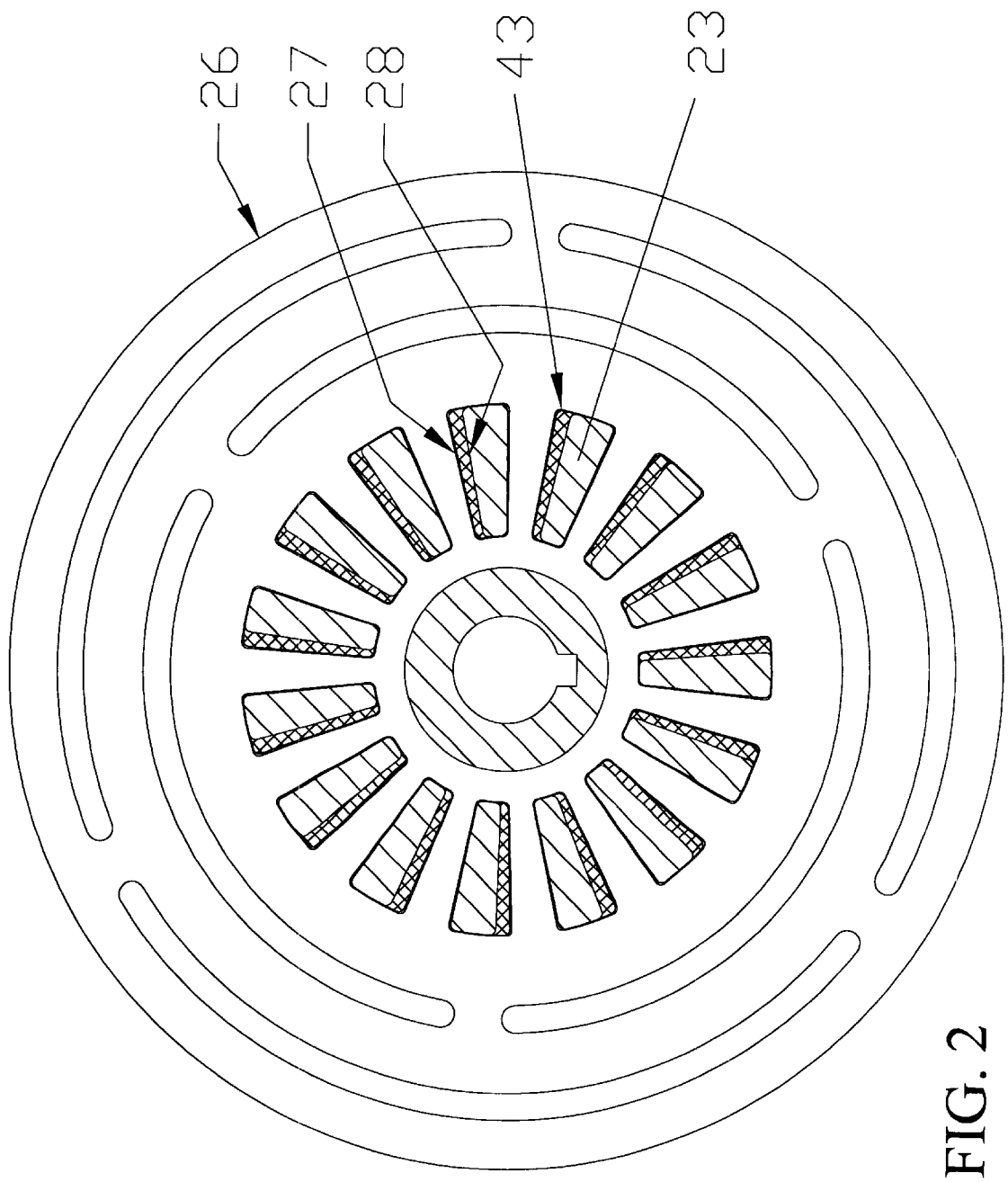
FIG. 2 shows a view of the working face of the armature with hub installed, showing the shape of the hub lugs as they protrude through the armature. This figure also shows the segments of the rubber torque cushion, extending along the side of each hub lug.

Referring first to FIGS. 1 and 2, an automotive air conditioning system compressor, indicated generally at 10, has a central drive shaft 12 that is powered, indirectly, through an engine belt driven pulley 14. Pulley 14 supports a generally iron or steel friction disk 16 coaxial to, and in a plane perpendicular to, the axis of drive shaft 12. Inboard of pulley 14 is a non-illustrated, conventional electromagnetic coil which, when actuated, produces a magnetic flux field in front of disk 16 capable of pulling inwardly any sufficiently nearby ferrous object. Pulley 14 runs freely on a ball bearing 18 until such time as the clutch assembly of the invention, a preferred embodiment of which is indicated generally at 20, closes to make a connection between pulley 14 and shaft 12. Clutch assembly 20 makes that connection in such a way as to both cushion the shock of initial engagement and disburse the force of engagement over a large support area.

Referring next to FIGS. 1 and 2, clutch assembly 20 includes a basically cylindrical central hub 22, which is pressed on to the end of shaft 12. Hub 22 has a front flange 24, from which fifteen separate lugs 23 extend axially toward the pulley face through piercings in the armature 26. The extension of the lugs through the armature piercings is shown by four dotted lines as in 25, FIG. 1. The armature 26 is held against the hub flange 24 by coil spring 40 in an operative position, that is, coaxial to the pulley disk 16 and axially spaced therefrom at a predetermined gap of about twenty thousandths of an inch. In the operative position, the armature 26 is ready to be electromagnetically pulled against pulley disk 16, when the clutch assembly 20 is actuated. At that point, the armature 26 can eventually stick to and turn one to one with the pulley disk 16, so as to transfer torque to shaft 12. Essentially every clutch assembly has both an armature, and a central hub that is bolted or otherwise joined to the shaft. The rest of the clutch assembly consists of the structure that fixes the armature to the hub. Here, the usual structure that provides this support and driving connection has been completely eliminated, and the armature is supported over a large area directly by the hub lugs. The result is a clutch assembly comprised of only three parts, or four parts if the rubber torque cushion is counted. Conventional clutches usually are comprised of about 10 parts. The reduced part count of this invention substantially reduces manufacturing costs and increases reliability.

Still referring to FIGS. 1 and 2, fifteen identical lugs 23, relatively long, about one half inch, in the radial direction, extend from the hub flange 24 and through the full thickness of the armature 26. Armatures generally are about one hundred and seventy five thousandths of an inch thick, or more. The substantial armature 26 thickness and relatively long radial length of hub lugs 23 form a large bearing area between the armature 26 piercing edge 27 and the side 28 of each lug 23. The combined area of contact between fifteen lugs 23 and fifteen armature piercing edges is relatively large. With such a large area of contact between the sides 28 of hub lugs 23 and armature 26 edges 27, the compressive stress on these adjacent faces from clutch driving torque is relatively low.

Referring to FIG. 2, a torque cushion 43 comprising an elastomeric material, such as, for example, rubber, is interposed between the sides 28 of lugs 23 and armature 26 piercing edge 27. This elastomeric material is subject to the same low compressive stress described above. The result is a large increase in clutch service life, because the rubber is never severely stressed. Also, the stress on the rubber is pure compressive stress. Elastomers generally resist compressive stress better than shear or tensile stress, and this invention exerts only compressive stress on the elastomer.

Figure 3:
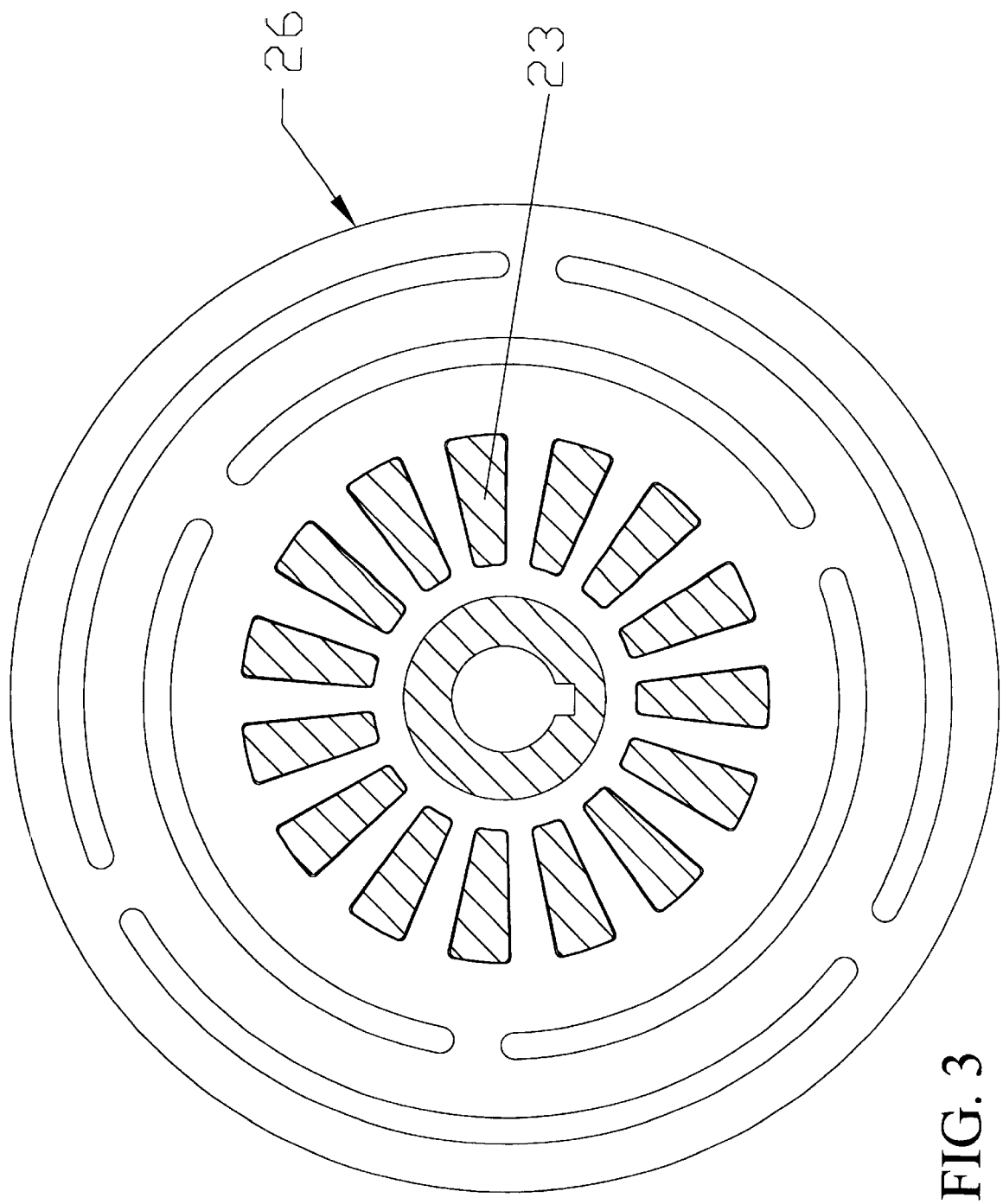
FIG. 3 shows the same view as FIG. 2, but without any torque cushion.

Referring to FIG. 3, in the alternate embodiment, with no rubber torque cushion, the low compressive stress results in a very low wear rate, and a longer clutch service life.

Referring to FIG. 1, elastomeric bumper pad 42 is interposed between hub flange 24 and armature 26. This absorbs the shock of the returning armature after clutch 20 is deactivated and coil spring 40 snaps armature 26 back against hub flange 24. Without such a bumper 42, the metal to metal impact of the returning armature 26 against hub flange 24 makes an audible click, which can annoy the occupants of the air conditioned vehicle.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electromagnetic clutch assembly for use in combination with an automotive air conditioning compressor having a central drive shaft and a powered rotor supported for free rotation about said drive shaft, said powered rotor having a generally annular friction disk coaxial to said drive shaft and facing in one axial direction relative to said compressor, said clutch assembly comprising:

a generally cylindrical, central hub fixed to said drive shaft, said hub having a cylindrical outer bearing surface and a front circular flange, with a plurality of concentric lugs extending axially from said flange toward said friction disk; and a generally annular armature of magnetic material having a plurality of concentric piercings closely fitting and substantially congruent to said hub lugs, with an outer edge of diameter comparable to said friction disk so as to be capable of being supported in an operative position generally coaxial thereto with an inner diameter piloted by a close fit to said hub outer bearing surface, and with an inner face axially spaced from said friction disk with a predetermined gap sufficiently small to allow said armature inner face to be electromagnetically pulled into engagement with said friction disk so as to rotate therewith when said clutch is actuated;

such that, when said clutch is actuated and said armature engages and rotates with said friction disk, said armature is piloted and held concentric to said hub by a plurality of closely fitting concentric bearing surface areas comprising said armature inner diameter in abutment with said hub outer bearing surface, and said plurality of hub lugs in abutment with said armature piercing edges;

wherein each lug has a relatively long radial length, such that, when said clutch is actuated and said armature engages and rotates with said friction disk, compressive stress between said relatively long radial length of said plurality of hub lugs in abutment with said armature piercing edges, arising from clutch torque, is significantly reduced, due to a relatively large total support area provided by said plurality of hub lugs in abutment with said armature piercing edges; and wherein said armature is held away from said friction disk by a compression spring coaxial with and anchored at one end to said hub outer bearing surface, such that, when said clutch is disengaged, said compression spring returns said armature to its original position at said predetermined axial spacing from said friction disk.

2. The electromagnetic clutch assembly of claim 1, wherein said compression spring comprises rubber or an elastomeric material.

3. The electromagnetic clutch assembly of claim 1, wherein said compression spring comprises a Belleville compression spring, or any similar stamped spring, coaxial with and anchored at its inner diameter to said hub outer bearing surface.

4. The electromagnetic clutch assembly of claim 1, further comprising:

a one-piece, unbonded flat sheet of resilient material interposed between said hub front circular flange and said armature, said resilient material having pierced openings generally congruent with and closely fitting around said hub lugs, such that, when said clutch is disengaged, said resilient material dampens noise of said armature as it impacts said hub circular flange, under action of said compression spring.

5. The electromagnetic clutch assembly of claim 1, further comprising:

a one-piece, unbonded torque cushion of resilient material interposed between said hub front circular flange and said armature, and between said hub lugs and said armature piercing edges, said torque cushion of resilient material having pierced openings generally congruent with and closely fitting around said hub lugs;

such that, when said clutch is disengaged, said torque cushion of resilient material dampens torsional shock of clutch engagement as said armature comes into contact with said friction disk.

6. An electromagnetic clutch assembly, comprising:

a central hub having a front circular flange, said flange having a plurality of concentric lugs extending axially therefrom for engaging an armature;

said armature being concentric to said hub, for engaging a friction disk; and said armature having a plurality of concentric piercings closely fitting and substantially congruent to said hub lugs, and said armature having an outer edge of diameter comparable to said friction disk;

wherein each lug has a relatively long radial length, such that, when said clutch is actuated and said armature engages and rotates with said friction disk, compressive stress between said relatively long radial length of said plurality of hub lugs in abutment with said armature, arising from clutch torque, is significantly reduced, due to a relatively large total support area provided by said plurality of hub lugs in abutment with said armature; and wherein said armature is held away from said friction disk by a compression spring coaxial with and anchored at one end to an outer bearing surface of said hub, such that, when said clutch is disengaged, said compression spring returns said armature to a predetermined axial spacing from said friction disk.

7. The electromagnetic clutch assembly of claim 6, wherein said compression spring comprises rubber or an elastomeric material.

8. The electromagnetic clutch assembly of claim 6, wherein said compression spring comprises a Belleville compression spring, or any similar stamped spring, coaxial with and anchored at its inner diameter to said hub outer bearing surface.

9. The electromagnetic clutch assembly of claim 6, further comprising:

a one-piece, unbonded flat sheet of resilient material interposed between said hub front circular flange and said armature, said resilient material having pierced openings generally congruent with and closely fitting around said hub lugs, such that, when said clutch is disengaged, said resilient material dampens noise of said armature as it impacts said hub circular flange, under action of said compression spring.

10. The electromagnetic clutch assembly of claim 6, further comprising:

a one-piece, unbonded torque cushion of resilient material interposed between said hub front circular flange and said armature, and between said hub lugs and said armature piercing edges, said torque cushion of resilient material having pierced openings generally congruent with and closely fitting around said hub lugs;

such that, when said clutch is disengaged, said torque cushion of resilient material dampens torsional shock of clutch engagement as said armature comes into contact with said friction disk.

* * * * *